US010915370B2

(12) United States Patent
Ruan et al.

(10) Patent No.: US 10,915,370 B2
(45) Date of Patent: Feb. 9, 2021

(54) INTER-HOST COMMUNICATION WITHOUT DATA COPY IN DISAGGREGATED SYSTEMS

(71) Applicant: INTERNATIONAL BUSINESS MACHINES CORPORATION, Armonk, NY (US)

(72) Inventors: Yaoping Ruan, White Plains, NY (US); John A. Bivens, Ossining, NY (US); Min Li, San Jose, CA (US); Ruchi Mahindru, Elmsford, NY (US); HariGovind V. Ramasamy, Ossining, NY (US); Valentina Salapura, Chappaqua, NY (US); Eugen Schenfeld, South Brunswick, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 16/204,550

(22) Filed: Nov. 29, 2018

(65) Prior Publication Data

US 2020/0174843 A1 Jun. 4, 2020

(51) Int. Cl.
*G06F 9/50* (2006.01)
*G06F 15/167* (2006.01)
(Continued)

(52) U.S. Cl.
CPC .......... *G06F 9/5072* (2013.01); *G06F 9/5016* (2013.01); *G06F 12/0802* (2013.01);
(Continued)

(58) Field of Classification Search
CPC .... G06F 12/1072; G06F 12/00; G06F 9/5072; G06F 9/5016; G06F 12/0802; G06F 15/167; G06F 15/17311; G06F 2209/5011
See application file for complete search history.

(56) References Cited

U.S. PATENT DOCUMENTS 8,209,510 B1* 6/2012 Thathapudi .......... G06F 12/145
711/163
9,201,837 B2 12/2015 Egi et al.
(Continued)

OTHER PUBLICATIONS

Tu et al., "Marlin: A Memory-Based Rack Area Network", Oct. 2014, ANCS 2014.*

(Continued)

*Primary Examiner* — Todd L Barker
(74) *Attorney, Agent, or Firm* — Griffiths & Seaton PLLC

(57) ABSTRACT

Direct inter-processor communication is enabled with respect to data in a memory location without having to switch specific circuits through a switching element (e.g., an optical switch). Rather, in this approach a memory pool is augmented to include a dedicated portion that serves as a disaggregated memory common space for communicating processors. The approach obviates the requirement of switching of physical memory modules through the optical switch to enable the processor-to-processor communication. Rather, processors (communicating with another) have an overlapping ability to access the same memory module in the pool; thus, there is no longer a need to change physical optical switch circuits to facilitate the inter-processor communication. The disaggregated memory common space is shared among the processors, which can access the common space for reads and writes, although particular locations in the memory common space for reads and writes are different.

25 Claims, 8 Drawing Sheets

(51) Int. Cl.
    *G06F 15/173* (2006.01)
    *G06F 12/0802* (2016.01)
(52) U.S. Cl.
    CPC ...... *G06F 15/167* (2013.01); *G06F 15/17331* (2013.01); *G06F 2209/5011* (2013.01)

(56) References Cited

U.S. PATENT DOCUMENTS

| | | | | |
|---|---|---|---|---|
| 9,304,714 | B2* | 4/2016 | Bennett | G06F 3/0689 |
| 10,157,146 | B2* | 12/2018 | Tsirkin | G06F 12/109 |
| 10,409,509 | B2* | 9/2019 | Bivens | G06F 3/064 |
| 2005/0081181 | A1* | 4/2005 | Brokenshire | H04L 63/168 |
| | | | | 717/100 |
| 2010/0161879 | A1* | 6/2010 | Nation | G06F 12/0813 |
| | | | | 711/103 |
| 2013/0103215 | A1 | 4/2013 | Dai et al. | |
| 2014/0280687 | A1 | 9/2014 | Egi et al. | |
| 2014/0359044 | A1 | 12/2014 | Davis et al. | |

OTHER PUBLICATIONS

Koh et al., "Disaggregated Cloud Memory with Elastic Block Management", Jun. 28, 2018, IEE Publishing.*

Anonymous, "Workload Optimization through Dynamic Reconfiguration of Compute Nodes," An IP.com Prior Art Database Technical Disclosure, IP.com No. IPCOM000215416D, Feb. 26, 2012 (4 pages).

Anonymous, "A cloud-based expert-sourcing system for advanced computational applications," An IP.com Prior Art Database Technical Disclosure, IP.com No. IPCOM000222342D, Sep. 26, 2012 (18 pages).

Anonymous, "Look-Ahead Multi-Pass Scheduling for Jobs of Variable Sizes," An IP.com Prior Art Database Technical Disclosure, IP.com No. IPCOM000242039D, Jun. 15, 2015 (5 pages).

* cited by examiner

INTER-HOST COMMUNICATION WITHOUT DATA COPY IN DISAGGREGATED SYSTEMS

BACKGROUND OF THE INVENTION

Technical Field

The present invention relates generally to data processing systems in a data center operating environment.

Background of the Related Art

In distributed computing, data exchange typically is achieved through communication via protocols such as TCP/IP, HTTP, and others. Such communication involves data copy from a source process and operating system memory, to a source networking stack, transfer over a network, and then data copy from a destination network stack, finally to a destination operating system and a target process memory. Some of this copying can be avoided depending on implementation. Thus, within a particular host, copying between process and operating system may be eliminated by memory mapping, or by zero-copy mechanisms that obviate the CPU from having to perform the task of copying data from one memory area to another. When computations are performed within a cluster of hosts, and provided that all the processes and hosts are trusted, shared memory may be adopted to facilitate communication between different processes. In shared memory systems, in effect all of the processes and hosts become a single computing environment.

The problem of data copy is exacerbated with the emergence of cloud computing services and software-as-a-service via application programming interfaces (APIs), which facilitate hybrid-computing environments wherein a data set may need to be processed across distinct computing environments (e.g., an enterprise and a public cloud, a private cloud and a public cloud, etc.). In such hybrid environments, each environment may work on a subset of the data or otherwise compute part of an entire processing pipeline. During such computation, typically some quantity of intermediate data is generated in the individual environment(s). To complete the final computation, often it is required that the intermediate data generated needs to be copied (typically over the network) to some single environment. An example of such a use case is MapReduce, which is a programming model and associated implementation for processing and generating large data sets with a parallel, distributed algorithm on a cluster. A MapReduce program is composed of a map procedure that performs filtering and sorting, and reduce method that performs a summary operation. When a MapReduce job is run, for example, across a hybrid environment comprising a trusted private cloud and a non-trusted public cloud, it may be desired to push as much data and computation as possible to the public cloud, e.g., due to its relatively lower cost.

Copying data across different hosts (e.g., in a cloud) is not only time-consuming, but it is also expensive, due to the cost of network communication. This is true even when data copy is required within the data center itself. Thus, for example, in a disaggregated approach, similar types of resource nodes in the data center are aggregated in respective pools, such as a processor pool, and a memory pool, and independent circuits are established as needed between the processor nodes and the memory nodes through an optical switch. In this architecture, processor nodes within a symmetric multi-processor (SMP) fabric (e.g., the nodes in a processor pool) are assumed to be able to communicate with one another. That said, and although processor nodes can access any of the remote memories through the independent circuits (through the optical switch), processor nodes do not have the capability to access the same memory device (e.g., a particular DIMM in a memory pool) at the same time. Thus, if the contents of a particular memory location need to be passed from one processor to another processor in the processor pool (a "processor-to-processor" or "inter-processor" communication), it is required to switch ownership of the memory (from one processor to the other). Such switching of physical memory modules through the optical switch takes tens of milliseconds, which is acceptable if the data set being passed is large. The overhead required to change the physical optical circuit between processors and memory pool modules (for passing the information), however, is undesirable for smaller messages.

BRIEF SUMMARY

According to this disclosure, direct inter-processor communication is enabled with respect to data in a memory location without having to switch specific circuits through a switching element (e.g., an optical switch). Rather, in this approach a memory pool is augmented to include a dedicated portion that serves as a disaggregated memory common space for communicating processors. The disaggregated memory common space may comprise part of an existing memory module in the memory pool, or it may be a memory module dedicated for this purpose. This approach obviates switching of physical memory modules through the optical switch to enable the processor-to-processor communication. Rather, processors (communicating with one another) have an overlapping ability to access the same memory module in the pool; thus, there is no longer a need to change physical optical switch circuits to facilitate the inter-processor communication. The overhead of optical switching is thus avoided. The disaggregated memory common space is shared among the processors, which can access the common space for reads and writes, although particular locations in the memory common space for reads and writes are different. In particular, each processor (that can access the memory common space) writes to one particular location while, with respect to that one particular location, all the other processors can only read therefrom.

The inter-processor communication approach may be implemented in association with various types of switches including, without limitation, symmetric multi-processing (SMP) and load/store.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

The techniques of this disclosure preferably are implemented within the context of a "disaggregated" compute system wherein a "disaggregated server"—sometimes referred to herein as a "server entity"—is composed or constitutes server resources selected from (or assigned from) shared server resource pools, namely, one or more of: a compute pool, a memory pool, an accelerator pool (e.g., a GPU accelerator, a network accelerator, etc.), a storage pool, and, as will be described below, a security-augmented (or "secure") processor pool. As the nomenclature suggests, a "compute" pool typically constitutes physical processors (such as CPUs), a "memory" pool typically constitutes physical memory devices (such as dual-inline-memory modules (DIMM)), etc. A given shared pool preferably includes just the particular resource types, but a particular resource pool may be composed of one or more resource sub-types. The notion of a "pool" is not intended to be limiting, as the common resources may be collected, aggregated or otherwise combined in any suitable manner. Further, a "pool" may be a dedicated set of resources that have the common type or sub-type, or some ad hoc collection of such resources. Preferably, a particular server entity comprises server resources from one or more of the server resource pools.

In a preferred embodiment, and as now described below, a disaggregated compute system in which the teachings of this disclosure are practiced utilizes optical (as opposed to electrical) interconnects for memory, although this is not a limitation.

Typically, the shared resource pools are available within the physical confines of a particular data center, although this likewise is not a limitation. Thus, the shared resource pools themselves may be shared across physical data centers. Further, a particular server entity is not required to be composed of resources from each of the server pools.

By way of background, but not by way of limitation, the following describes a representative computer environment in which the techniques of this disclosure (described below) may be practiced.

Figure 1:
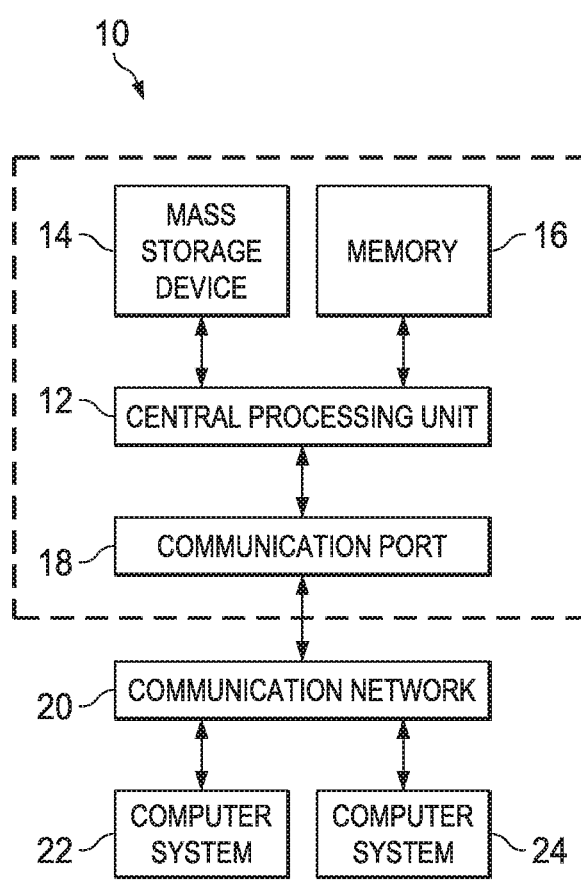
FIG. 1 depicts an exemplary block diagram illustrating a computing system environment in which exemplary aspects of the disclosure may be implemented.

Turning now to FIG. 1, exemplary architecture 10 of a general computing environment in which the disaggregated compute system of this disclosure may be implemented and/or comprised of, is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
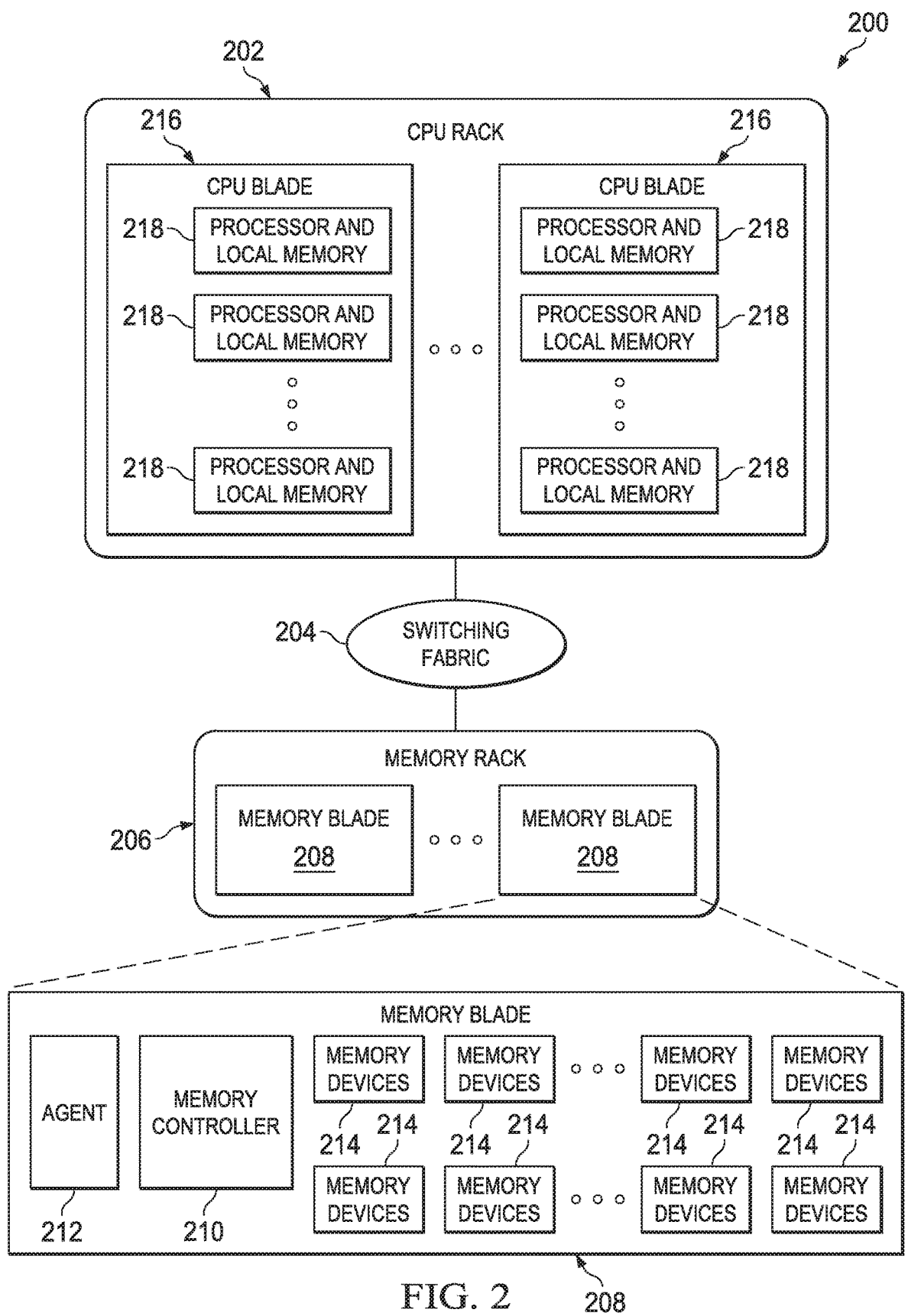
FIG. 2 is an exemplary block diagram of a hardware structure of an optically-connected memory system in which aspects of the illustrative embodiments may be implemented.

FIG. 2 is an exemplary block diagram 200 showing a hardware structure of an optically connected memory system in a computer system. The segregation of memory 214 from the CPU 218 through an optical interconnection fabric 204 is feasible due to the high bandwidth distance product of the optical link 204. In such an Optically-Connected Memory (OCM) system 200, the CPU 218 and memory 214 are organized into separate racks 202 and 208 connected through optical links and at least one switching fabric 204. In the memory rack 206, memory blades 208 are arranged and communicatively coupled to other memory blades and a processor (CPU) rack 202. Each memory blade 208 houses multiple memory devices 214, an agent 212, and a memory controller 210. The CPU rack 202 includes processor blades 216 with each of the processor blades 216 communicatively coupled to other processor blades 216 and the memory rack 206. The processor blades 216 include processors 218, with each processor 218 containing local memory (not shown). The processors 218 (and respective physical computation nodes) inside a processor rack 216 are connected locally by a known fast interconnection means (not shown), which could be a direct connected network with some topology between the processors' 218 physical computation nodes within the processor blades 216, or a switch, through memory via a cache coherent symmetric multiprocessor (SMP) fabric, or a combination of the above. Each of the processors 218, processor blades 216, memory 214, and memory blades 208, share a number of optical external links. These external links are made for optimizing a point-to-point connection within the optical-switching fabric at very high bandwidth. This optimization may be in the physical implementation used, or in the protocol chosen to facilitate such high bandwidth, and preferably it has the ability to support memory switching within one physical link or multiple physical links to look like one high bandwidth physical link made of a few physical links. Because these external links typically are circuit-switched via at least one optical switch 204 that will not be aware of the data or content thereof, these should use a very lightweight communication protocol.

The physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect in the optics domain, the light beams within these external links, regardless of their number of wavelength, protocol, and signaling speed. Preferably, and in the embodiment depicted, these external links are common to all memory blades and processor blades.

In the preferred architecture, at least one optical circuit switch is shared between the optical external links. Also, several independent circuits may be established between the processors and the memory blades sharing the optical circuit switch. These external links are made for optimizing a point-to-point connection at very high bandwidth. This optimization may be in the physical implementation used in the protocol chosen to facilitate such high bandwidth and has the ability to support aggregation of multiple streams within one physical link or multiple physical links to look like one high bandwidth physical link made of a few physical links. Because these external links are circuit switched via an all optical switch that will not be aware of the protocol, data or content thereof, a very light weight communication protocol is used. Furthermore, the physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect, in the optics domain, the light beams within these external links regardless of their number of wavelength, protocol, and signaling speed. These external links are common to all processors, blades, memory, and independent circuits, such that any memory blade/processor blade may pass information on one or all of these external links, either directly or by passing through the interconnected processor blades. In one exemplary embodiment, circuit-switching switches are used. Circuit switching switches do not need to switch frequently, and thus may be much simpler to build, and can use different technologies (e.g., all optical, MEMS mirror based) to dynamically connect between the circuits, memory, and processor blades.

These types of external links (not shown) and the dynamic switching enable very high throughput (e.g., high bandwidth) connectivity that dynamically changes as needed. As multi-core processing chips require very high bandwidth networks to interconnect the multi-core processing chips to other such physical processing nodes or memory subsystem, the exemplary optically-connected memory architecture plays a vital role in providing a solution that is functionally enabled by the memory switching operations.

The optically-connected memory architecture 200 engenders numerous benefits: (a) transparent memory capacity changes across the system nodes, (b) eliminate notion of worst-case provisioning of memories and allow the applications to vary memory footprints depending on the workloads, and (c) decouple the CPU downtime from the memory module failure, thus increasing the CPU availability. As will be described below, an architecture for memory management techniques is provided. As shown in FIG. 2, the processor blades 202 host a number of processors 218, whereas the memory modules 241 are packed (e.g., arranged) in the memory blades 208. The processor blades 216 and memory blades 208 are organized in separate racks 202 and 206, which are interconnected through an optical switching fabric 204. Each of the processors 218 in the CPU blade 202 may have a local memory pool 310a-n, which is used for faster memory accesses. A memory blade 208 can integrate, in addition to dynamic random-access memory (DRAM) memory devices, alternate memory devices, such as Flash or phase-change-memory, without any changes to the CPU blades 216.

Figure 3:
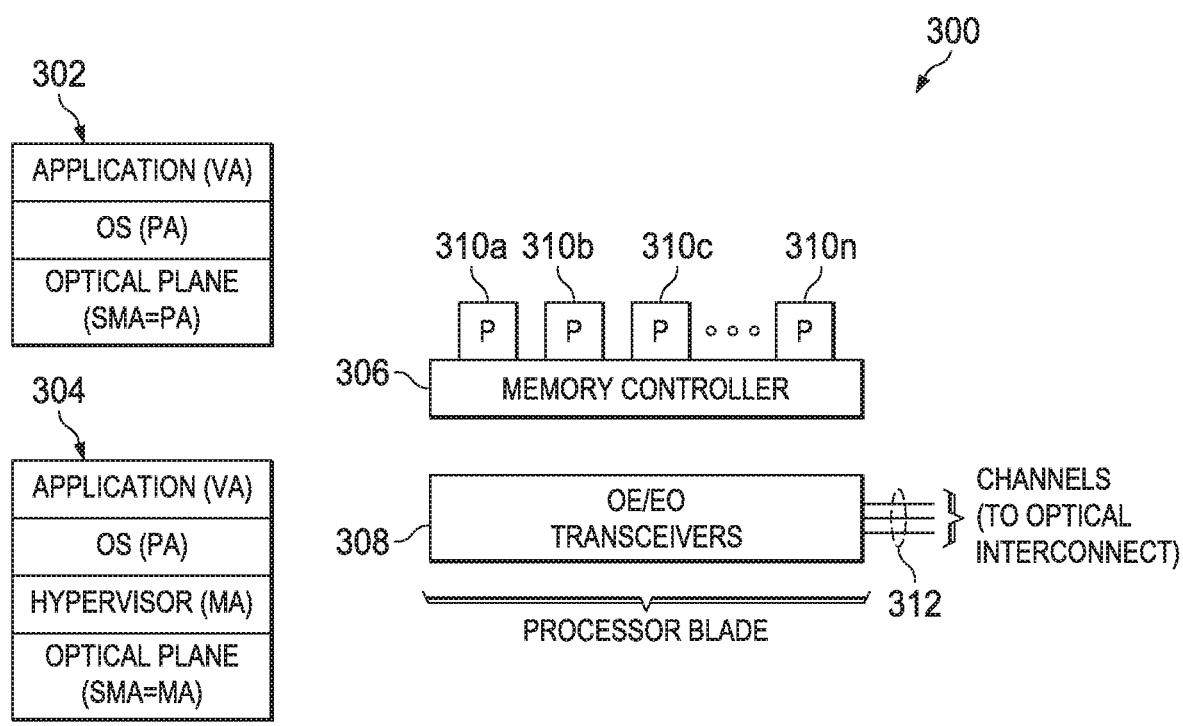
FIG. 3 depicts a block diagram illustrating a hardware structure of a processor design in the optically-connected memory system in FIG. 2.

Turning now to FIG. 3, FIG. 3 is a block diagram 300 showing a hardware structure of a processor design in the optically-connected memory system in a computer system. As illustrated in FIG. 3, the processor side design 300 illustrates: software stack in system (without virtualization) 302 and 304 (with virtualization), and the processor blade communicates with remote memory blades through optical transceiver 308 and 312. There is a memory controller 306 associated with local memory pool 310a-n. If a System Memory Address (SMA) space (as shown in 302 and 304 of FIG. 3) is above a certain, predefined limit, the SMA is mapped to a Remote Memory Address (RMMA) space, and the access request is routed to the remote memory blade through the proper channels. It should be noted that the memory blade 208 (see FIG. 2) maintains a separate address space called Remote Memory Address (RMMA) space.

In an optically-connected memory system (see FIG. 2 200), each processor node 218 maintains, for both remote and local memory, the SMA space. The processor node 218 maps the local physical memory to the lower portion of this address space. The remote memory is mapped to the available (i.e., higher) SMA address space (shown in 302 and 304). At the remote memory side, the memory blade 208 maintains the RMMA. Therefore, each memory access at the processor side should first be mapped to the SMA space (as shown in 302 and 304 of FIG. 3). If the SMA (as shown in 302 and 304) corresponds to the remote memory, the SMA (as shown in 302 and 304 of FIG. 3) is mapped to the RMMA, and this RMMA is sent to the remote memory blade 208. The optical plane translates the SMA (as shown in 302 and 304 of FIG. 3) to the respective RMMA and interacts with the remote memory, as illustrated in FIG. 3.

The processor blade (as shown with components 306, 308, and 310a-n in FIG. 3) connects to the remote memory through Electrical-to-Optical (EO)/Optical-to-Electrical (OE) transceivers 312 which are connected to, for example, a Northbridge™ chipset. Note that in a virtualized system the SMA (as shown in 304 of FIG. 3) corresponds to the Machine Address (MA) (as shown in 302 and 304), and in a system without virtualization the SMA (as shown in 302 in FIG. 3) corresponds to the physical address (PA). As shown in the FIG. 3, each processor blade (shown with components 306, 308, and 310a-n) may have simultaneous connections to multiple memory blades through separate channels. Here, in case of a single-mode optical fiber, a channel corresponds to a separate optical transceiver, whereas with wavelength-division multiplexing (WDM) a single transceiver may provide multiple channels.

Figure 4:
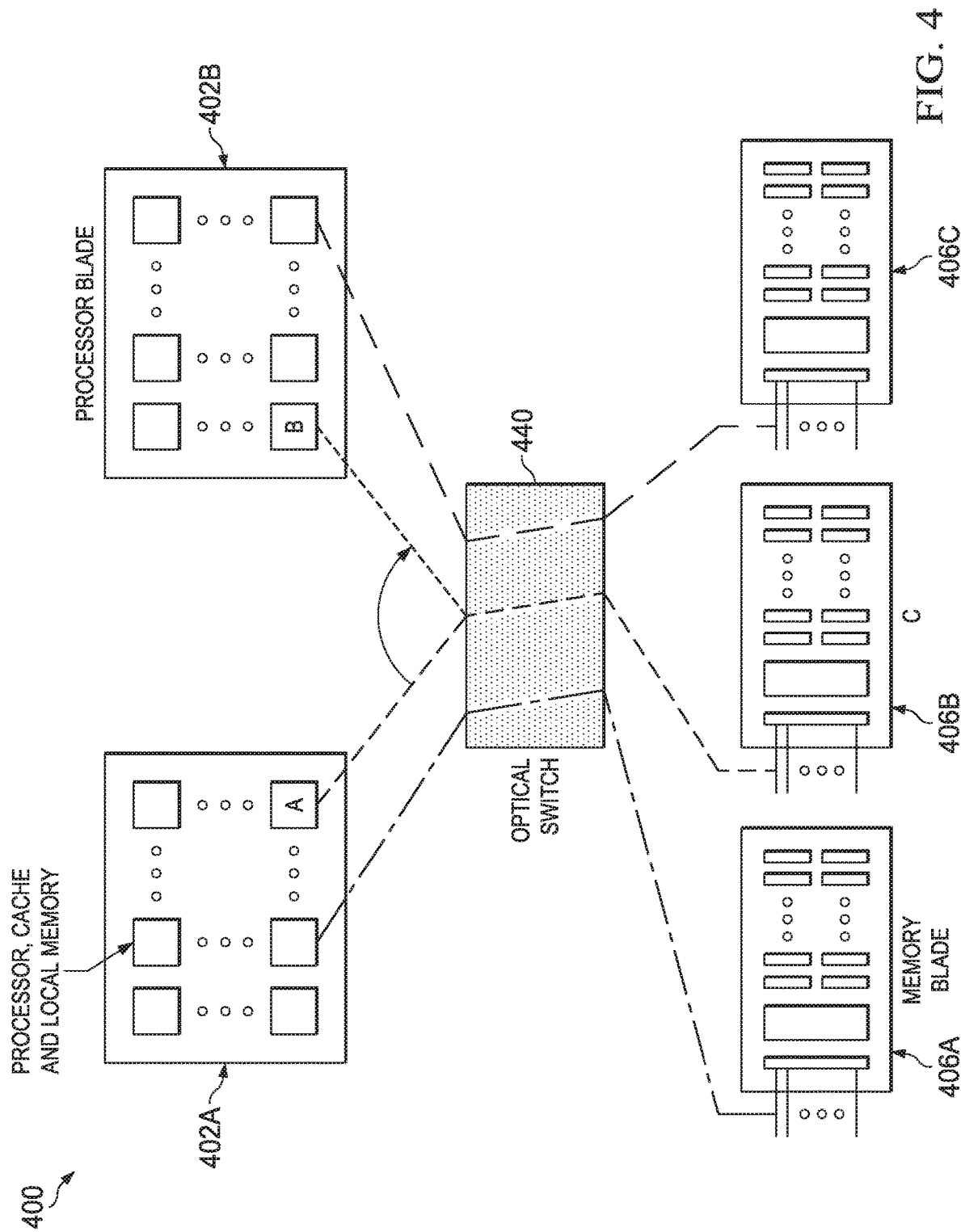
FIG. 4 is a block diagram illustrating a hardware structure for switching memory through an optical interconnection fabric in a computer system.

In an optically-connected system, processor nodes access remote memories through independent circuits established between the processor nodes and the remote memory blades. Turning now to FIG. 4, an exemplary block diagram 400 showing a hardware structure for switching memory through an optical interconnection fabric in a computer system is depicted. Processor B 402B establishes a circuit with the remote blade C 406B and gains access to the data previously held by processor A 402A. As outlined above in FIG. 2-4, a processor node has multiple channels to the remote memory blades; also, each of the memory blades is equipped with multiple channels, enabling the memory blades to be shared across multiple processor nodes. The optical channels (in a memory blade or a processor node) are provided by one or more optical transceivers. A processor node 402 (shown as 4027A and 402B) can allocate memory from a remote memory blade by initiating a circuit with the memory blade 406 (shown as 406A-C) and sending the memory request to the remote memory controller. In such a memory system, a processor node 402 holding super pages within a remote memory blade can signal another processor to establish a circuit with the remote memory blade 406 (shown as 406A-C) initiating a transfer of memory space to the latter processor node. The former processor node (e.g., processor A 402A) can send the RMMA address space to the receiving processor node (e.g., processor B 402B), which can access the same data resident on the supplied address space. The sending processor may tear down (e.g., disconnect) the circuit with the remote memory blade 406 (shown as 406A-C) if it no longer requires any super pages at that memory blade (e.g., memory blade 406B). Such a process of transferring address space across processor nodes is referred to as memory switching. The memory switching process is shown in FIG. 4, where a processor node A 402A sends data stored in a remote memory blade C 406 to a processor node B 402B. The processor B 402B initiates a circuit with the remote memory blade C 406. Note that as a memory blade 406 may have multiple channels, the memory space of the memory blade 406 may be shared across multiple processor nodes, each memory space occupying a non-overlapping portion of the total space within the memory blade 406. Also, the source and destination side of memory switching may be referred to as switch-out and switch-in operations, respectively.

Processor nodes within the SMP fabric (e.g., the nodes in processor pool 402A) are assumed to be able to communicate with one another. That said, and although processor nodes in each SMP domain shown in FIG. 4 (e.g., domain 402A or domain 402B) can access any of the remote memories through the independent circuits established between the processor nodes and the remote memory nodes through the optical switch 440, it should be appreciated that processor nodes do not access the same memory device (e.g., a particular DIMM in memory blade 406C) at the same time. Thus, if the contents of a particular memory location need to be passed from one processor to another processor in the processor pool (a "processor-to-processor" or "inter-processor" communication), it is required to switch ownership of the memory (from one processor to the other). This is the case despite the fact that, as noted above, processor nodes can otherwise communicate directly with one another. Such switching of physical memory modules through the optical switch takes tens of milliseconds, which is acceptable if the data set being passed is large. The overhead required to change the physical optical circuit between processors and memory pool modules (for passing the information), however, is undesirable for smaller messages.

The technique of this disclosure addresses this requirement, as will now be described.

Inter-Host Communication without Data Copy in Disaggregated Systems

In particular, and according to this disclosure, direct inter-processor communication is enabled with respect to data in a memory location without having to switch specific circuits through the optical switch. Rather, in this approach a memory pool is augmented to include a dedicated portion that serves as a disaggregated memory common space for communicating processors. The disaggregated memory common space may comprise part of an existing memory module in the memory pool, or it may be a memory module dedicated for this purpose. This approach obviates the requirement of switching of physical memory modules through the optical switch to enable the processor-to-processor communication. Rather, processors (communicating with another) have an overlapping ability to access the same memory module in the pool; thus, there is no longer a need to change physical optical switch circuits to facilitate the inter-processor communication. The overhead of optical switching is thus avoided. The disaggregated memory common space is shared among the processors, which can access the common space for reads and writes, although particular locations in the memory common space for reads and writes are different. In particular, each processor (that can access the memory common space) writes to one particular location while, with respect to that one particular location, all the other processors can only read therefrom.

Figure 5:
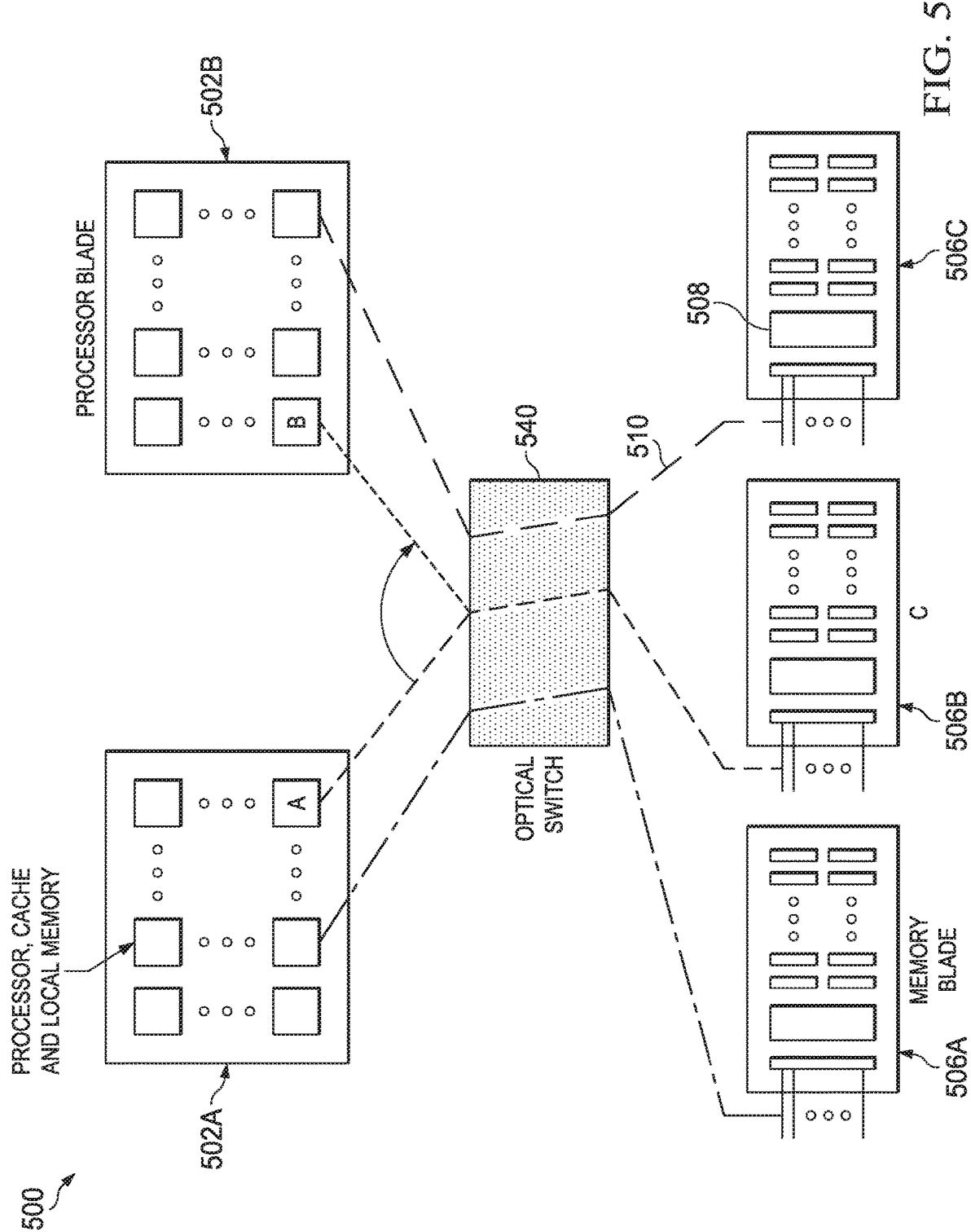
FIG. 5 depicts a modified version of the hardware structure of FIG. 4 that has been augmented to include a disaggregate memory common space to facilitate processor-to-processor communication without data copy or use of the optical switch according to this disclosure.

Thus, according to this disclosure, the optically-connected memory system is enhanced as depicted in FIG. 5. FIG. 5 is similar to FIG. 4 except for the inclusion of the additional memory chip 508, which for convenience is shown in the memory pool 506C. Each memory pool 506A, 506B, etc. may likewise include the memory chip 508. Each such memory chip 508 provides a disaggregated memory common space for reads/writes between communicating processors as described above. In particular, this memory is shared among the processors that can access it to read and write, with the locations in that shared memory space for reads and writes being different, as noted.

By including the disaggregated memory common space, the approach herein enables a way to efficiently exchange data chunks in memory between different processors (or "hosts") in a disaggregate compute system, preferably via dynamically-changing memory bus links 510 to the memory chip 508, and by translating the appropriate memory addresses (from a running program on one processor to another program on another processor). This enables a current owner of a data chunk to operate directly on the data without copying or other communication protocols. In effect, the processor-to-processor communication approach provides the ability to detect and maintain a "state" of the operations on the data chunk and to transit (transfer) that state to another program as the processor owning the data chunk changes. The data itself, however, is maintained non-volatile in the memory module. More generally, the technique provides for a way to control and assign the ownership (by different processors) of a specific data chunk among different programs running on those different processors.

As depicted in FIG. 5, typically there are multiple possible connections to each memory pool through high speed point-to-point memory links 510. The controllers of such a disaggregated pool (e.g., memory controller 210 in FIG. 2, or memory controller 306 in FIG. 3) are able to facilitate load/store threads at different priorities, thus the main use of processors to read/write memory for normal access typically does not suffer, as the communication between processors is done between main access queues of the memory chip 508. In a modern processor design, many in-flight load/store operations are pending, thus preferably the memory pool controller sorts and keeps high priority memory transactions first, with the inter-process communication (according to this disclosure) done second (but without starvation). The memory controller is responsible for translating the memory addresses to facilitate the inter-processor communication. In particular, the memory controller has knowledge of the disaggregated memory common space that is being shared, and it knows the particular physical location to which a particular processor can write, as well as the address that a particular processor believes it is writing to. As noted above, each processor is assigned a particular location for writes, and the other processors can only read from that particular location. As noted above, the particular locations in the memory common space for reads and writes are different, and the memory controller keeps track of this information and, as necessary, provides the address translation to facilitate the inter-processor communication when data in an actual physical location must be accessed by multiple processors at the same time—all without setting up the circuits through the optical switching. The inter-processor communication thus occurs without data copy and through the disaggregated memory common space instead of the switch.

Figure 6:
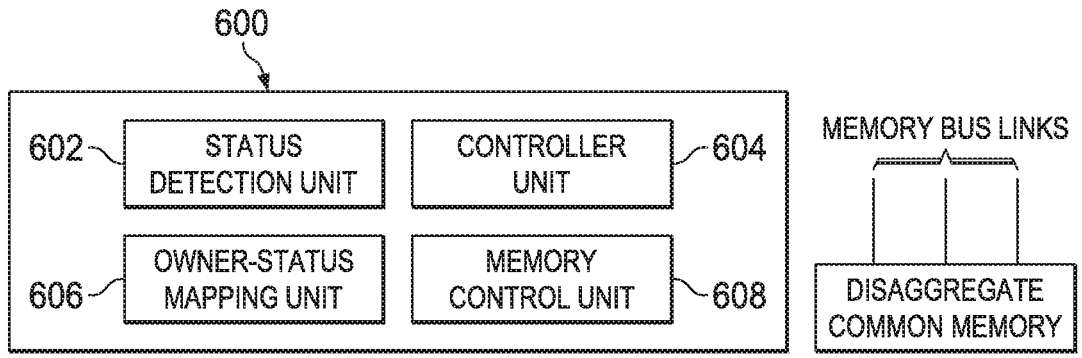
FIG. 6 depicts a control system for management inter-host communication without data copy in a disaggregate compute system according to this disclosure.

Preferably, the use of the disaggregated memory common space for inter-process communication is configured for relatively smaller messages (small data chunks) as opposed to larger data. The size threshold (i.e., which data is handled through the disaggregated memory common space) is configurable. Typically, provisioning occurs statically in an off-line manner via a job scheduler that has privileged access to the switching architecture. The following describes a representative scheduler for this purpose As depicted in FIG. 6, preferably an inter-host communication control system 600 comprises a number of components. In particular, and in one embodiment, the control system 600 comprises a status detection unit 602, a controller unit 604, an owner-status mapping unit 606, and one or more memory control units 608. One of these units (or "components") may be integrated with one another or be implemented as functions of other systems, devices, controllers, programs or processes. The particular nomenclature is not intended to be limiting. Further, these components are described here functionally, but this also is not intended as a limitation, as the particular operations may be implemented in any convenient manner. Generally, the status detection unit 602 detects and thus has knowledge of the running state of a program. One or more data chunks (data) are assumed to be associated with a particular running state of the program. The controller unit 604 generally provides a switching operation to provide memory bus link changes. The owner-status mapping unit 606 is used schedule and assign an appropriate memory overlapping region (the disaggregated memory common space) to a rightful owner (processor). The memory control unit 608 is provided with each pool to keep data non-volatile and (as necessary) to translate any legacy data address. Thus, the controller unit 604 and memory control unit 608 provide the memory controller functions for the inter-processor communication.

Figure 7:
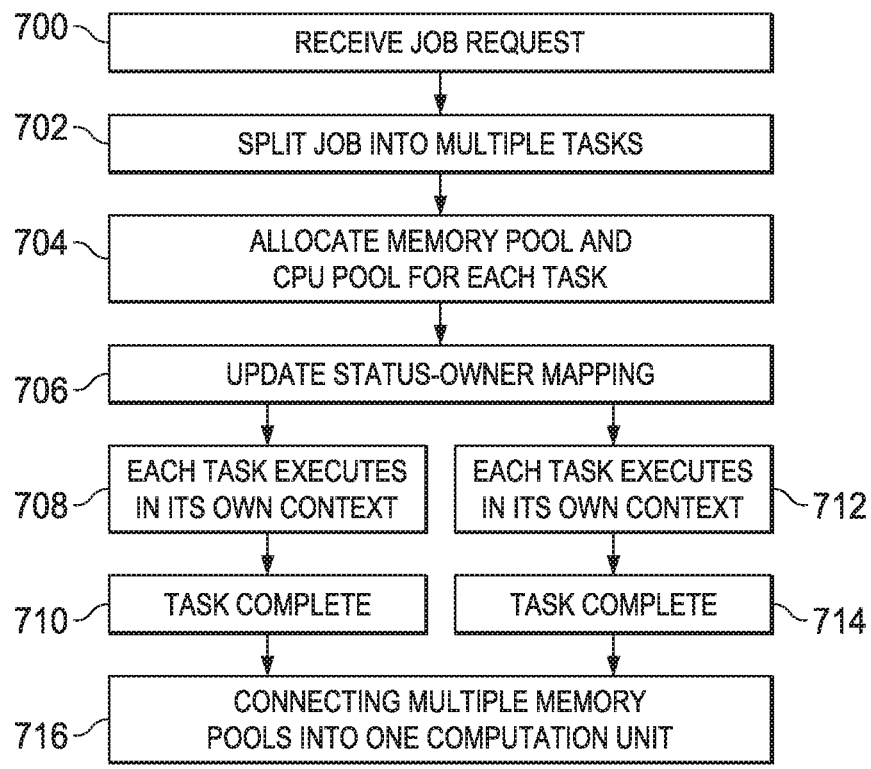
FIG. 7 depicts a process flow for processing a job request using the control system in FIG. 6.

FIG. 7 depicts a process flow illustrating how tasks of a request job are processed concurrently in a set of memory/CPU pools without data copy according to this disclosure. The process begins at step 700 upon receipt of a job request. At step 702, the job identified by the job request is split into multiple tasks. At step 704, each task in the set of multiple tasks is allocated to a memory pool and its associated CPU pool. A particular memory pool may be connected to one or more CPU pools over the memory links. The routine then continues at step 706 to update a status-owner mapping. Steps 708-710 and 712-714 depict how each task then executes in its own context and (eventually) completes. These operations are depicted in parallel. After all of the tasks are complete, the routine then continues at step 716 to dynamically connect together the multiple memory pools (via their memory links) into what is, in effect, a single computation unit. By separately processing the tasks of the job in the manner, the approach enables the local memory control unit for each memory pool to keep its associated data in the associated memory pool as non-volatile, thereby avoiding data copy.

Thus, and as depicted in FIG. 7, a new job request is received and, for each subset of the job, one or more memory pools and corresponding CPU pools are allocated and connected to compute the subset. The owner-status mapping unit 706 maintains a current mapping (in an appropriate data structure) that associates a task number of the task, the memory pool, and the CPU pool. Once the task is completed, the status detection unit 702 raises a "complete" signal to update the owner-status mapping unit 706 that the task assigned is now complete. The memory control unit 708 associated with the memory pool (for the task) maintains the current data in the memory pool, even if the associated CPU pool is disconnected from the memory pool. Because the separate processing paths (shown as steps 708-710 and 712-714 in FIG. 7) do not necessarily complete at the same, the owner-status mapping unit 706 must then determine a next step for the job, e.g., wait for the other tasks to complete, start a data combination procedure, or the like. The determination to start the data combination procedure typically depends on the nature of the job, the number of tasks that have been completed (relative to the total), or some other factor(s), which may be configurable or set by default. Once the owner-status mapping unit 706 determines (according to its configuration or otherwise) that enough tasks have completed, preferably a data combination (merge) procedure is initiated. During this merge procedure, preferably all of the memory pools are connected to a single set of CPU pools, and individual memory control units 708 work together to translate data addresses as necessary.

The technique of this disclosure have significant has significant advantages. First, by separating communication to overlapping memory regions where communication happens at the memory pool side (and using point-to-point disaggregated links), such communication does not congest either the general purpose network or the SMP fabric (e.g., 502A in FIG. 5) that is left to handle coherent shared memory traffic. In past methods, a shared memory has been implemented over a general purpose network, with RDMAs type of communication mechanisms (e.g., Ethernet) or a shared memory coherent fabric (e.g. PERCS) that passes through multiple hops, thereby resulting in higher latency and complexity. Second, as most applications exhibit good cache locality, both their bandwidth to the memory links as well as the bandwidth of the memory modules (e.g., DIMMs) are under-utilized. Thus, instead of going through the usual I/O stack, NIC, switch and network, those links and modules save the need and reduce the overhead significantly. Further, even in the situation that memory bandwidth is all used, cycle-stealing of such memory bandwidth can facilitate communication in a more efficient way, thereby enabling re-architecting of computer systems in a more disaggregated manner. The approach herein thus eliminates much of the bandwidth needed through I/O, and it keeps communication to cases of true coherent multi reads/writes.

Implementation of the inter-host communication technique in association with an SMP fabric as described above is not intended to be limiting. SMP fabric is expensive to operate, as its functions are more complex than other approaches, such as load/store. The inter-host communication technique of this disclosure may also be implemented in association with a load/store fabric, as will now be described.

Figure 8:
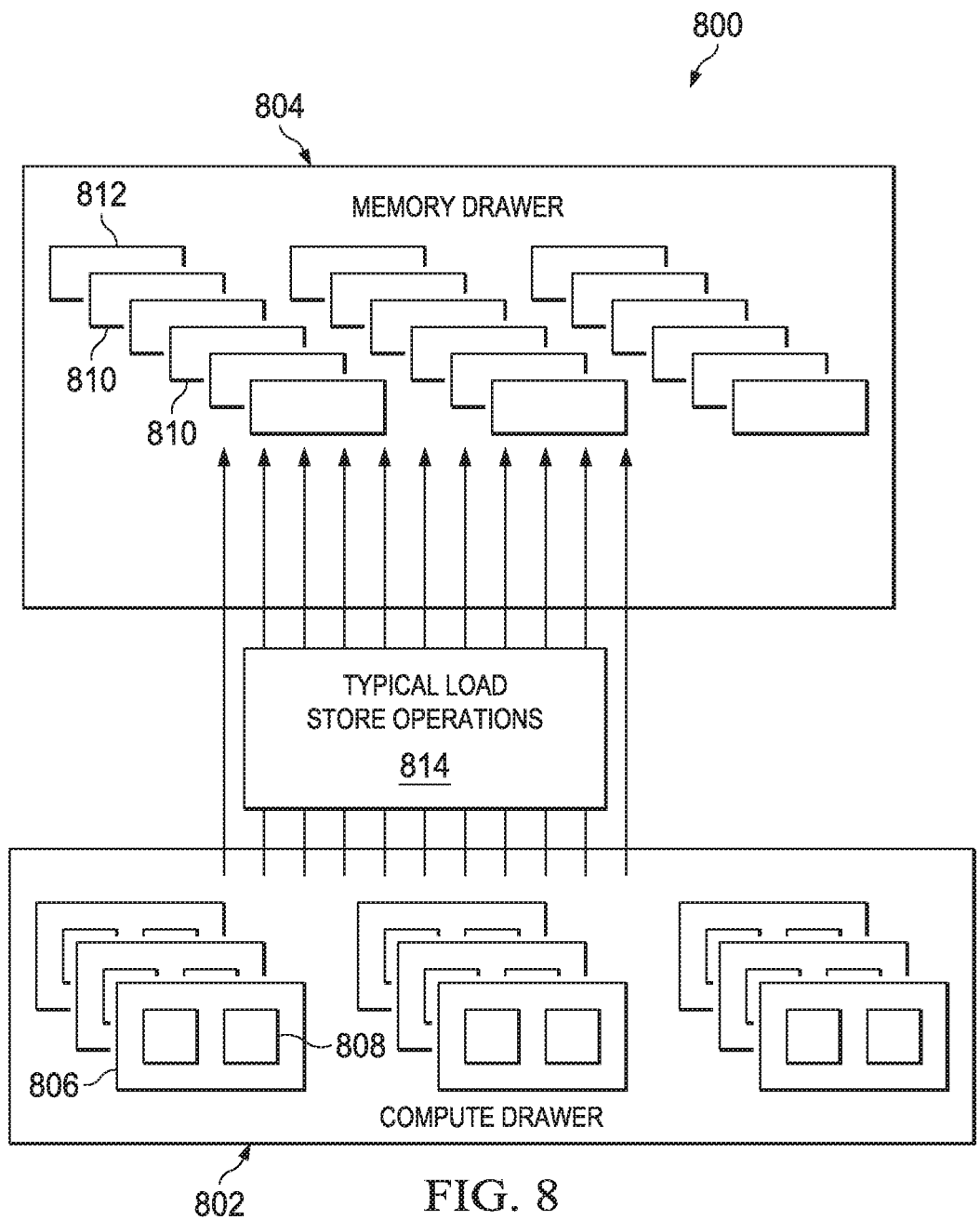
FIG. 8 depicts a load/store switching fabric in which the inter-processor communication technique of this disclosure may be implemented.

By way of brief background of this alternative embodiment, FIG. 8 depicts a portion of the data center 800 is shown and includes a processor pool, identified as a "compute drawer" 802, and a memory pool, identified as a "memory drawer" 804. The compute drawer 802 includes blocks 806 of processors (typically CPUs), each of which typically includes one or more CPUs 808. The memory drawer 804 includes blocks 810 of memories, each of which typically includes one or more DIMM modules 812. Typical load-store operations 814 are also depicted.

In the load/store embodiment, a processor connecting to a memory module (even its local directly-attached memory chip/module) uses a load/store memory transaction (read from memory or write to memory).

Thus, as shown in FIG. 8, memory blades are grouped into a "drawer." Drawers in principle can be connected with optical links through the switch (drawer-to-drawer with circuits) when required to facilitate communication passing (in the form of simple load/store) between different blades in different drawers, assuming no reassignment of the already existing optical circuits between the processors to the memory blades. The load/store is very simple and does not require complex communication (like multicast or broadcast); rather, exactly one processor can own a "write" to some memory module, and all writes are routed (from the load/store fabric) from the already-connected link that processor has to that memory module. The same is true for the "reads" with respect to processors that are allowed to access and read from the memory module.

When the approach of this disclosure is used in the load/store fabric context of FIG. 8, the connections between memory blades (within a drawer) and even between memory pool drawers are load/store transactions that are simply passed (routed) to the right memory modules, e.g., based on their addresses and other ownership identifiers that the memory system has assigned for such to facilitate communication between the involved processors. Of course, it is possible that multiple processors share the same memory pool drawers with different memory blade connections, or even the same memory blade connections, in either case the memory blade controller facilitates such communication locally from the optical circuits connecting the processors to it directly.

Thus, according to this disclosure, different processors map to different memory blades for their usual work and have a common memory module, e.g., in one of the existing memory blades to which they connect (if both connect to the same blade, or if they connect to two different blades in the same memory pool drawer, or if they connect to two different memory pool drawers) to facilitate the inter-processor communication in the manner described. Of course, from a resource allocation perspective, it is preferably (easiest and cheapest) when they are located (load/store connection-wise) in the same memory blade and get a separate memory module for the inter-processor communication. A next best approach is for them to be located in the same memory pool drawer.

Although not depicted in FIG. 8, it should be appreciated that the load/store embodiment may comprise drawers (for memory) that are located in different locations (in a rack or nearby some rack) and are connected via direct optical links (circuits) to facilitate communications passing between drawers when the common memory is accessed from already-connected locations.

As noted above, preferably the approach is implement in a disaggregated server system environment. For completeness, the following section provides additional details of this type of environment.

Disaggregated Server Systems

Preferably, server resources in or across one or more data centers are disaggregated into shared server resource pools, namely, one or more of: a compute pool, a memory pool, an accelerator pool, a storage pool, and the like. As noted above, servers preferably are constructed dynamically, for example, on-demand and based on workload requirements, by allocating from these resource pools. Preferably, a disaggregated compute system of this type keeps track of resources that are available in the shared server resource pools, and manages those resources based on that information.

In such a system, typically a tracking mechanism associated with the disaggregated compute system includes a database. The database stores data that tracks resource state or status (e.g., idle or used CPUs, memory, accelerator, and other components) of the various resources that define a server available from the resource pools. Additionally, the database stores a data record (or, more generally, a data set) that, for each defined server (sometimes referred to as a "server entity"), identifies the resources (e.g., the CPU(s), memory, accelerator, or other components) that comprise the server. Preferably, the data record is associated with an identifier, such as a unique server ID, and each resource that comprises the server is associated in the database with that unique server identifier. The individual components of the resource pools also include identifiers that are tracked in the database. The resource-specific identifiers provide information regarding the resource status, attributes, relationship to other resources, and the like. Thus, the database, which may be centralized or distributed, acts a repository of information regarding server entities, the server pools, and the various resources that comprise a particular server entity.

In response to a request for data center resources, e.g., when allocating a new server, a server entity is defined by selecting resources from the one or more resource pools. The resources may be selected based on a projected need or specified demand associated with the request, or some other criteria. The server entity is associated with the unique server ID, which is stored in the database together with the identifiers for the resources that comprise the server entity. The server entity may then be scaled up or down as necessary based on the workload requirements of the request or one or more related or associated requests.

Thus, for example, as the request is processed, or as additional related requests are received for processing, the tracking system monitors usage to determine if an adjustment to the resources comprising the server entity is needed. When, based on the monitoring, the tracking system determines that an adjustment in the server entity components is necessary, the adjustment is carried out, e.g., by changing the allocation of resources that are associated with the server entity. Thus, for example, when additional compute and memory are needed (scale-up), the tracking system (by itself, or by cooperation with other resource provisioning systems in the data center) adjusts the server entity, e.g., by selecting additional processors and memory, which are then added to the server entity. These additional processors and memory may be selected based on one or more criteria, such as load, proximity to the existing resources that comprise the server entity, availability, and the like, as indicated by the information being maintained and tracked in the database. When, on the other hand, the monitoring indicates that fewer resources are required (scale-down), the tracking system adjusts the server entity, e.g., by de-selecting certain processors and memory, which are then de-allocated from the server entity and returned to their respective resource pools.

Figure 9:
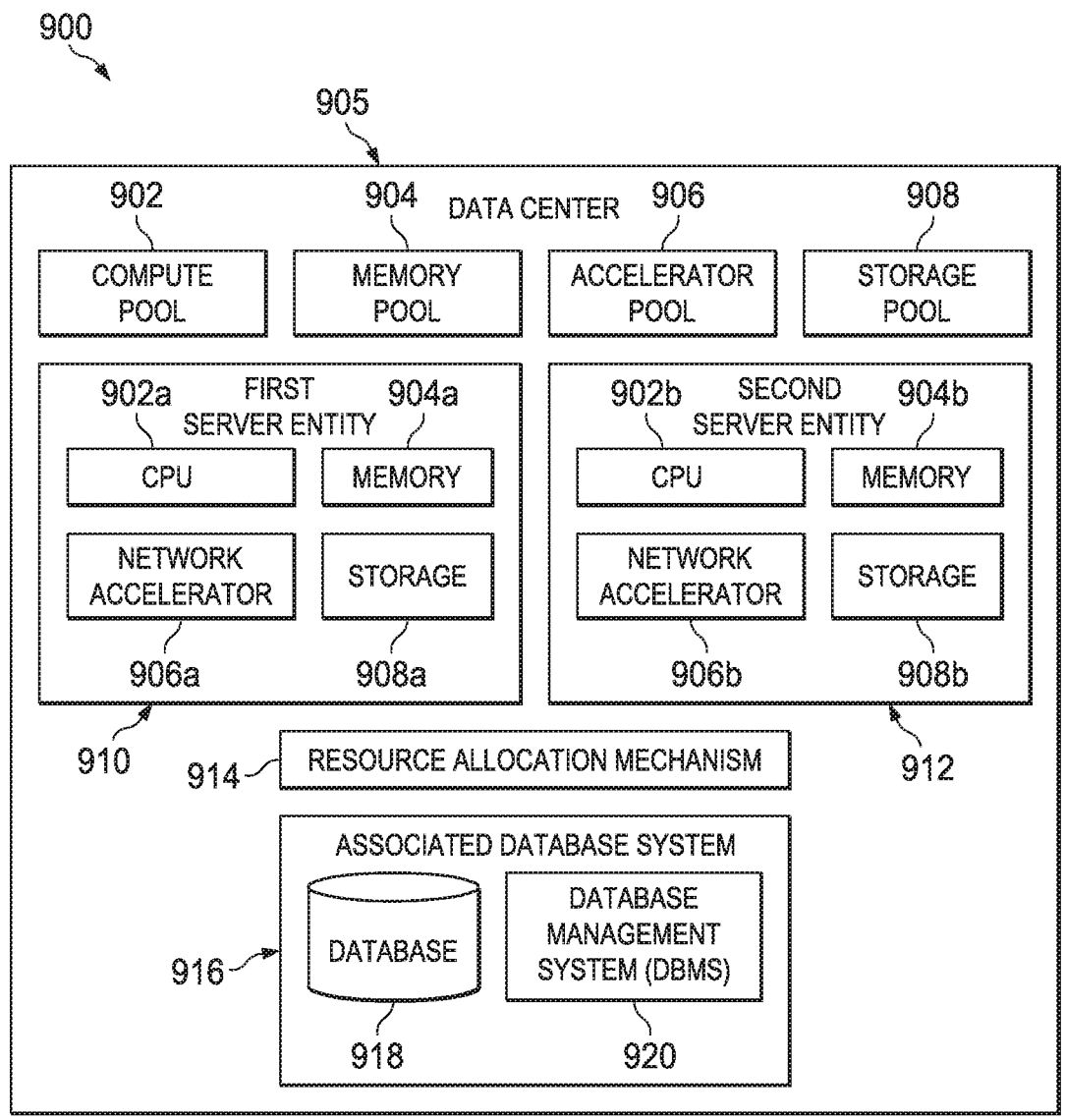
FIG. 9 depicts a disaggregate compute system in which the techniques of this disclosure may be implemented.

With reference now to FIG. 9, a disaggregated compute system 600 is depicted. The disaggregated compute system 900 is configured within a data center 905 in which a switching optically-connected memory architecture is used. In the disaggregated compute system 900, there are shared server pools, e.g., a compute pool 902, a memory pool 904, an accelerator pool 906, a storage pool 908, and perhaps others. There may be a single instance of a resource pool, or multiple such instances (sometimes referred to as "multiple pools"). In the approach herein, particular servers that service customer workloads are constructed dynamically, for example, on-demand and based on workload requirements, by allocating from these resource pools. Thus, for example, a first server entity 910 may comprise CPU 902a (selected or otherwise obtained from compute pool 902), memory 904b (selected or otherwise obtained from memory pool 904), accelerator 906c (selected or otherwise obtained from accelerator pool 906), and storage 908d (selected or otherwise obtained from storage pool 908). A second server entity 912 may comprise CPU 902b, memory 904a, accelerator 906b and storage 908a. These examples are merely representative. Moreover, and as will be described, the particular server pool resources that comprise a given server entity may change.

Preferably, once a particular resource of a resource pool is associated with a given server entity, that particular resource is not available to be used to constitute another server entity. Stated another way, preferably an allocated resource of a resource pool remains associated with the server entity until it is de-allocated, at which point the resource is returned back to the resource pool and can be used again by another server entity. Although not intended to be limiting, preferably a server entity (once created) is associated with one and only one data center customer (tenant). In other words, server entities preferably are not shared across tenants.

To manage such allocations and de-allocations, the disaggregated compute system 800 has the capability to keep track of resources that are available in the shared server resource pools and that are allocated or de-allocated to the various server entities. To this end, the disaggregated compute system 900 comprises (or has associated therewith) a tracking system comprising a resource allocation mechanism 914, and an associated database system 916. Generally, the tracking system is implemented as a data processing system, and it may operate in a standalone manner or as a component of some other system or functionality in the data center.

Typically, the resource allocation mechanism 914 is implemented in software, namely, as set of computer program instructions, executing in one or more hardware processors. The resource allocation mechanism 914 may comprise one or more sub-systems or modules, processes, programs or execution threads, and such components may be co-located or distributed. The resource allocation mechanism 914 generally is responsible for executing one or more allocation algorithms that create and manage server entities according to this disclosure. Representative algorithms include, for example, a new server allocation algorithm that is used to perform an initial build of the server entity, a server scale-up algorithm that in the case of an existing server is used to add more resources to the existing server entity when more capacity is needed to handle the workload, and a server scale-down algorithm that in the case of an existing server is used to de-allocate (shed) resources from the existing server entity when less capacity is needed to handle the workload. One or more of such functions may be combined, and other types of algorithms may be implemented by the resource allocation mechanism 914.

The one or more algorithms that comprise the resource allocation mechanism 914 used information stored in the database system 916 to carry out the management functions. As noted above, the database system 916 stores information that tracks the state, status or other properties and attributes of the various resources in the shared server pools. In addition, the database stores information about each server entity built by the resource allocation mechanism. Generalizing, and as well-known, the database system 916 comprises a database 918, namely, a collection of data organized in one or more ways (e.g., via schemas, tables, queries, report, views and other objects), together with a database management system (DBMS) 920, which is a computer software application that interacts with the user, other applications, and the database to capture and analyze data. A general purpose DBMS enables the definition, creation, querying, update and administration of databases. A representative DBMS is IBM® DB2®.

In one embodiment, the database 918 is relational. The database stores a data record (or, more generally, a data set) that, for each defined server entity, identifies the resources that comprise the server. Preferably, the data record is associated with an identifier, a unique server ID, and each resource that comprises the server is associated in the database with that unique server identifier. Thus, continuing with the example described above, the first server entity 10 may be associated with unique server $ID_1$, while the second server 912 may be associated with user server $ID_2$, and so forth.

Preferably, the individual components of the resource pools also include identifiers that are tracked in the database; when a resource is allocated to a server entity, the resource's identifier then gets associated with (cross-referenced to) the server entity. Thus, continuing with the first example above, the various resource-specific identifiers for the CPU 902a, memory 904b, network accelerator 906c and storage 908d are associated (by relational tables or otherwise) with unique server ID1, which is the unique server identifier for the first server entity 910.

When the server entity is first built, it includes a set of one or more server pool resources selected from the server pools by the resource allocation mechanism. Thus, the unique server identifier for the server entity will have an initial set of resource-specific identifiers associated therewith. As resources are later allocated or de-allocated from the server entity, the set of constituent resource identifiers associated with a particular server entity identifier thus changes as well.

As noted above, there may be multiple instances of a resource pool. When multiple instances exist, particular resources to support the server entity are then selected from one or more of those instances. Preferably, if resources assigned to a first instance of a resource pool are used to build the server entity, when it becomes necessary to add capacity to that server entity, preferably the additional resources are also drawn from the same instance where possible.

Preferably, the resource-specific identifiers provide information regarding the resource status, attributes, relationship to other resources, and the like. Thus, the database, which may be centralized or distributed, acts as a repository of information regarding server entities, the server pools, and the various resources that comprise a particular server entity.

Although a relational database is useful for implementation, the server entity identifiers and resource-specific identifiers may be related to one another in other ways, e.g., as linked lists, data arrays, hash tables, or otherwise.

In general, the resource allocation mechanism 914 and the database system 916 work together to manage the disaggregated compute system. The resource allocation mechanism functions as a tracking system that keeps track of idle and used CPUs, memory, accelerator and other components that define a server. Additionally, the tracking system keeps a record of each defined server of what CPUs, memory, accelerator or other components are part of the server. As noted, and for each defined server, a unique ID is specified, and the requested number of CPUs, memory and storage are selected from the pool of idle resources, e.g., based on their locality, best fit and future expansion needs as will be further described. The unique server ID, and also IDs of each of these resources, are recorded in the tracking system. Preferably, and as noted above, the used components are marked as used and are removed from the pool of idle components.

Preferably, each component of the server entity is tagged with the unique server ID with which it is a part. Thus, the component is made aware that it is a component of the server entity identified by the unique server ID.

Preferably, each request issued to the disaggregate compute system, as well as the data received in response to the request, also are tagged with the server entity ID. When, for example, the request is received at a resource, the resource then compares the server entity ID tagged to the request to the server entity ID for the resource. In other words, the component is provided with the capability to check if the request matches the server entity ID to which the component has been allocated. If so, the component recognizes the request as something that can be consumed and acted upon. When the server entity ID tagged to the request does not match the server entity ID tagged to the component, the component knows that the request can be ignored.

The algorithms used for resource selection (new server allocation, server scale-up and server scale-down) can use common criteria to facilitate the selection, or these algorithms can differ from one another, e.g., based on the resource topology and the purpose of resource allocation. When resources are interconnected, more flexibility in allocated resources is available to the system. For resources that are not directly interconnected, preferably the algorithm(s) consider the hierarchy of resources, as well as other factors, such as number of hops, latency, cost and so forth. In the latter case, preferably the algorithm tries to minimize the number of hops.

The disaggregated server architecture of FIG. 9 preferably includes a memory management service to enable the multiple memory pools (the memory blades in FIG. 5) to operate more efficiently and with increased performance and greater memory utilization. As noted, typically each memory pool has one-to-multiple possible connections to one-to-multiple processors (typically CPU pools) through high speed memory link(s). Memory components from the memory pool can be used, re-used or shared among different tenants and processing components. The memory management service may have responsibility for creating the memory pool. Typically, the basic memory component that managed in the pool is a memory module allocation block (e.g., a DIMM module). This is not a limitation, however, as a memory component (or "resource") in the pool may be any other type of physical memory structure. The memory management service may be implemented by a "memory manager" component or mechanism.

As noted above, and according to this disclosure, different processors typically map to different memory blades for their usual work, and they then use the common memory module in one of the existing memory blades to which they connect (whether in the same blade, whether they connect to two different blades in the same memory pool, or whether they connect to two different memory pool drawers, etc.) for the inter-processor communications. Of course, it is preferable to have the resources located in association with the same memory pool drawer, and this resource allocation may be established by the resource allocation mechanism previously described.

As has been described, the functionality described above may be implemented as a standalone approach, e.g., a software-based function executed by a processor, or it may be available as a service. The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various server-side architectures including simple n-tier architectures, web portals, federated systems, and the like. As already noted, the techniques herein also may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, certain aspects of the technique herein (e.g., memory address translation) are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

While the above-described compute environment is preferred, it is not intended to be limiting. Aspects of the disaggregated compute system of this disclosure may be implemented in a data center that provides a conventional cloud computing model of service delivery.

The techniques herein generally provide for the above-described improvements to a technology or technical field, such as data center architectures, disaggregate compute environments, and the like, as well as the specific technological improvements to memory pool management schemes, such as described above.

In the context of this disclosure, the notion of a "common memory space" should also be deemed to cover a "transferable" memory space in the memory pool, wherein the transferrable memory space refers to a memory region for reads and writes that occur at different times. In other words, a particular memory region may serve both purposes (reads and writes) at different times.

One skilled in the art will appreciate that techniques of this disclosure typically are implemented in a hybrid of circuit and packet switching fabrics. In particular, typically the group connections between processor pools and memory pools are circuits. As is well-known, a circuit switch does not involve any additional handling of the fabric packet communications once a circuit (i.e. a link through the optical (or electrical) switch) is made from a processor to the memory. The latency of a circuit switch will only be proportional to the speed of light over the relevant distance. In contrast, the local memory pool connections typically are packet-switched, but they go only to the local pool (drawer) of memory. Thus, the memory pool switching fabric typically is of a packet switching type, and it goes to local memory controllers within a drawer, although two drawers can connect with a circuit. Theses circuits isolate the complexity of the scaling of the network due to the many number of parties that need to communicate (in this case, memory pool controllers and processors).

The invention claimed is:

1. A method of managing memory in a disaggregated compute environment, the disaggregated compute environment comprising a processor pool including a set of processors, and a memory pool including a set of memory devices, wherein a processor in the set of processors is coupled to a memory device in the memory pool via a switch, comprising:
    defining a common memory space in the memory pool, the common memory space being an overlapping memory region for reads and writes between communicating processors in the set of processors;
    assigning locations in the common memory space for processor reads and writes, wherein a particular processor is assigned a particular location in the common memory space for a write, and one or more other processors can only read from the particular location; and
    responsive to a request, communicating data stored in the memory pool between a first processor and a second processor, the data being communicated via the common memory space in lieu of using the switch.

2. The method of claim 1, wherein communicating data includes dynamically-changing memory bus links to the common memory space.

3. The method of claim 1, wherein communicating data includes translating memory addresses associated with the common memory space from the first processor to the second processor.

4. The method of claim 3, wherein the first processor executes a first process and the second processor executes a second process, the first and second processes respectively executed parallelly or sequentially in any order.

5. The method of claim 4, wherein communicating the data transfers a state of operations on the data between the first process and the second process.

6. The method of claim 5, wherein the data is maintained non-volatile in the memory pool.

7. The method of claim 4, wherein:
    the first and second processes comprise tasks associated with a single job; and
    upon determining that at least one of the first and second processes have completed executing, merging the data associated with the single job from the first and second processes via the memory address translation of the common memory space.

8. The method of claim 1, wherein the switch is one of: an optical interconnect, and a load/store fabric.

9. A system to manage memory in a disaggregated compute environment, the disaggregated compute environment comprising a processor pool including a set of processors, and a memory pool including a set of memory devices, wherein a processor in the set of processors is coupled to a memory device in the memory pool via a switch, comprising:
  one or more hardware processors;
  computer memory holding computer program instructions executed by the hardware processors and operative to:
    define a common memory space in the memory pool, the common memory space being an overlapping memory region for reads and writes between communicating processors in the set of processors;
    assign locations in the common memory space for processor reads and writes, wherein a particular processor is assigned a particular location in the common memory space for a write, and one or more other processors can only read from the particular location; and
    responsive to a request, facilitate communicating of data stored in the memory pool between a first processor and a second processor, the data being communicated via the common memory space in lieu of using the switch.

10. The system of claim 9, wherein the computer program instructions are operative to dynamically-change memory bus links to the common memory space.

11. The system of claim 9, wherein the computer program instructions are operative to translate memory addresses associated with the common memory space from the first processor to the second processor.

12. The system of claim 11, wherein the first processor executes a first process and the second processor executes a second process, the first and second processes respectively executed parallelly or sequentially in any order.

13. The system of claim 12, wherein communicating the data transfers a state of operations on the data between the first process and the second process.

14. The system of claim 13, wherein the data is maintained non-volatile in the memory pool.

15. The system of claim 12, wherein:
  the first and second processes comprise tasks associated with a single job; and
  upon determining that at least one of the first and second processes have completed executing, merging the data associated with the single job from the first and second processes via the memory address translation of the common memory space.

16. The system of claim 9, wherein the switch is one of: an optical interconnect, and a load/store fabric.

17. A computer program product in a non-transitory computer readable medium for use in a data processing system to manage memory in a disaggregated compute environment, the disaggregated compute environment comprising a processor pool including a set of processors, and a memory pool including a set of memory devices, wherein a processor in the set of processors is coupled to a memory device in the memory pool via a switch, the computer program product holding computer program instructions executed in the data processing system and operative to:
  define a common memory space in the memory pool, the common memory space being an overlapping memory region for reads and writes between communicating processors in the set of processors;
  assign locations in the common memory space for processor reads and writes, wherein a particular processor is assigned a particular location in the common memory space for a write, and one or more other processors can only read from the particular location; and
  responsive to a request, facilitate communicating of data stored in the memory pool between a first processor and a second processor, the data being communicated via the common memory space in lieu of using the switch.

18. The computer program product of claim 17, wherein the computer program instructions are operative to dynamically-change memory bus links to the common memory space.

19. The computer program product of claim 17, wherein the computer program instructions are operative to translate memory addresses associated with the common memory space from the first processor to the second processor.

20. The computer program product of claim 19, wherein the first processor executes a first process and the second processor executes a second process, the first and second processes respectively executed parallelly or sequentially in any order.

21. The computer program product of claim 20, wherein communicating the data transfers a state of operations on the data between the first process and the second process.

22. The computer program product of claim 21, wherein the data is maintained non-volatile in the memory pool.

23. The computer program product of claim 20, wherein:
  the first and second processes comprise tasks associated with a single job; and
  upon determining that at least one of the first and second processes have completed executing, merging the data associated with the single job from the first and second processes via the memory address translation of the common memory space.

24. The computer program product of claim 17, wherein the switch is one of: an optical interconnect, and a load/store fabric.

25. A disaggregated computing machine, comprising:
  a processor pool including first and second processors;
  a memory pool having memory modules;
  an optical interconnect or load/store switch fabric; and
  a memory controller executing in a hardware element and operative (i) to define a common memory space in the memory pool, the common memory space being an overlapping memory region for reads and writes between the first and second processors; (ii) to assign locations in the common memory space for processor reads and writes, wherein a particular processor is assigned a particular location in the common memory space for a write, and one or more other processors can only read from the particular location; and (iii) responsive to a request, to facilitate communicating of data stored in a memory module between the first processor and the second processor, the data being communicated via the common memory space in lieu of using the optical interconnect, the load/store switch fabric, or a network.

* * * * *